(12) United States Patent
Murakami et al.

(10) Patent No.: US 8,295,696 B2
(45) Date of Patent: Oct. 23, 2012

(54) CAMERA MODULE AND IMAGING APPARATUS

(75) Inventors: Kazuomi Murakami, Aichi (JP); Nobuyuki Nagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/929,860

(22) Filed: Feb. 22, 2011

(65) Prior Publication Data
US 2011/0236009 A1 Sep. 29, 2011

(30) Foreign Application Priority Data

Mar. 25, 2010 (JP) ................................. 2010-069892

(51) Int. Cl.
G03B 3/10 (2006.01)
G03B 13/34 (2006.01)
(52) U.S. Cl. ........ 396/133; 396/205; 348/357; 359/822; 359/823; 359/824
(58) Field of Classification Search ............. 396/133, 396/205; 348/357; 359/822, 823, 824
See application file for complete search history.

(56) References Cited

U.S. PATENT DOCUMENTS

| | | | |
|---|---|---|---|
| 7,504,608 B2 * | 3/2009 | Klein | 250/201.1 |
| 2007/0070235 A1 * | 3/2007 | Maejima et al. | 348/335 |
| 2007/0122132 A1 * | 5/2007 | Misawa et al. | 396/55 |
| 2008/0144186 A1 * | 6/2008 | Feng et al. | 359/666 |
| 2008/0157631 A1 * | 7/2008 | Heim et al. | 310/330 |
| 2008/0212959 A1 * | 9/2008 | Shin et al. | 396/508 |
| 2009/0161239 A1 * | 6/2009 | Verhaar et al. | 359/824 |
| 2010/0033835 A1 * | 2/2010 | Heim et al. | 359/683 |
| 2010/0232034 A1 * | 9/2010 | Polyakov et al. | 359/694 |

FOREIGN PATENT DOCUMENTS

| | | |
|---|---|---|
| JP | 2006-166638 | 6/2006 |
| JP | 2006-293007 | 10/2006 |

* cited by examiner

*Primary Examiner* — Clayton E Laballe
*Assistant Examiner* — Warren Fenwick
(74) *Attorney, Agent, or Firm* — Rader Fishman & Grauer, PLLC

(57) ABSTRACT

A camera module includes a barrel, a movable lens movable in the barrel in an optical axis direction, an imaging device that captures an image of a subject viewed through the movable lens and an actuator that changes the distance between the movable lens and the imaging device. The actuator has a first power feed terminal at one end thereof and a second power feed terminal at the other end thereof. The first terminal is attached on the side where the movable lens is present. The second terminal is attached on the side where the barrel is present. The actuator bends when electric power is fed to each of the first and second terminals and changes the distance between the movable lens and the imaging device.

8 Claims, 12 Drawing Sheets

CAMERA MODULE AND IMAGING APPARATUS

BACKGROUND OF THE INVENTION

1. Field of the Invention

The present invention relates to a camera module and an imaging apparatus incorporated in a mobile terminal and other small electronic apparatus, and particularly to a camera module and an imaging apparatus whose sizes are reduced by simplifying the configuration of a movable lens actuator.

2. Description of the Related Art

A small, thin camera module is incorporated in a mobile phone, a PDA (Personal Digital Assistant), and other small information processing apparatus. A camera module of this type needs to be smaller and thinner in order to meet demands for further reduction in size and thickness of such small information processing apparatus. To achieve the reduction in size and thickness, some camera modules employ a polymer actuator as a movable lens actuator (see JP-A-2006-293007).

To move a focusing lens or any other movable lens in a camera module in the optical axis direction, it is typically essential to increase the magnitude of thrust force and the response speed of the actuator. The load acting on the actuator increases, for example, in the following situations: when the weight of a movable lens increases; when the reaction force of a slidable member increases; and when the elasticity of a spring increases. When eccentricity of the lens is taken into account, in particular, it is necessary to support the movable lens by using a shaft so that the lens can be moved in the optical axis direction. In this case, friction between the shaft and a sliding hole on the movable lens side also increases.

To drive a movable lens in a camera module, it is therefore necessary to output a thrust force greater than or equal to the load described above. It is further desirable at the same time, for example, to achieve autofocus at a fast drive response speed.

A polymer actuator, however, has a small magnitude of thrust force because the actuator itself is soft by nature. The response speed of a polymer actuator is proportional to a voltage fed thereto, but the applied voltage decreases with distance from a voltage feed point due to resistance distributed across a membrane of the polymer actuator, resulting in decrease in the response speed.

JP-A-2006-293007 does not solve the problem described above because it employs a structure having two shafts. In this case, the response speed decreases because friction is produced between the shafts and sliding holes of a lens holder and electric power is fed to a polymer actuator only on one side.

SUMMARY OF THE INVENTION

It is desirable to provide a camera module and an imaging apparatus capable of improving the response speed of a focusing lens or any other movable lens.

According to an embodiment of the invention, there is provided a camera module including a barrel, a movable lens provided to be movable in the barrel in an optical axis direction, an imaging device that captures an image of a subject viewed through the movable lens, and an actuator that changes the distance between the movable lens and the imaging device.

The actuator has a first power feed terminal provided at one end thereof and a second power feed terminal provided at the other end thereof. The first terminal is attached on the side where the movable lens is present, and the second terminal is attached on the side where the barrel is present.

The actuator bends when electric power is fed to each of the first and second terminals and changes the distance between the movable lens and the imaging device.

According to another embodiment of the invention, there is provided an imaging apparatus including a barrel, a movable lens provided to be movable in the barrel in an optical axis direction, an imaging device that captures an image of a subject viewed through the movable lens, and an actuator that changes the distance between the movable lens and the imaging device.

The actuator has a first power feed terminal provided at one end thereof and a second power feed terminal provided at the other end thereof. The first terminal is attached on the side where the movable lens is present, and the second terminal is attached on the side where the barrel is present.

The actuator bends when electric power is fed to each of the first and second terminals and changes the distance between the movable lens and the imaging device.

The actuator described above can, for example, be a polymer actuator.

According to the embodiments of the invention described above, a plurality of actuators is used, and electric power is fed to each of the actuators via the first and second terminals disposed on opposite sides. A movable lens moving mechanism using the actuators described above can therefore be smaller than a moving mechanism using a voice-coil motor in related art. Further, the response speed of the moving mechanism can be improved as compared with a case where a lens holder slides along a shaft.

DESCRIPTION OF THE PREFERRED EMBODIMENTS

A camera module to which the invention is applied and which is incorporated in a mobile phone will be described with reference to the drawings. The description will be made in the order of the following items:
1. Description of Mobile Phone
2. Description of Camera Module
2-1. First Embodiment
2-2. Second Embodiment
2-3. Variation of Polymer Actuator
3. Variations (1. Description of Mobile Phone)

Figure 1:
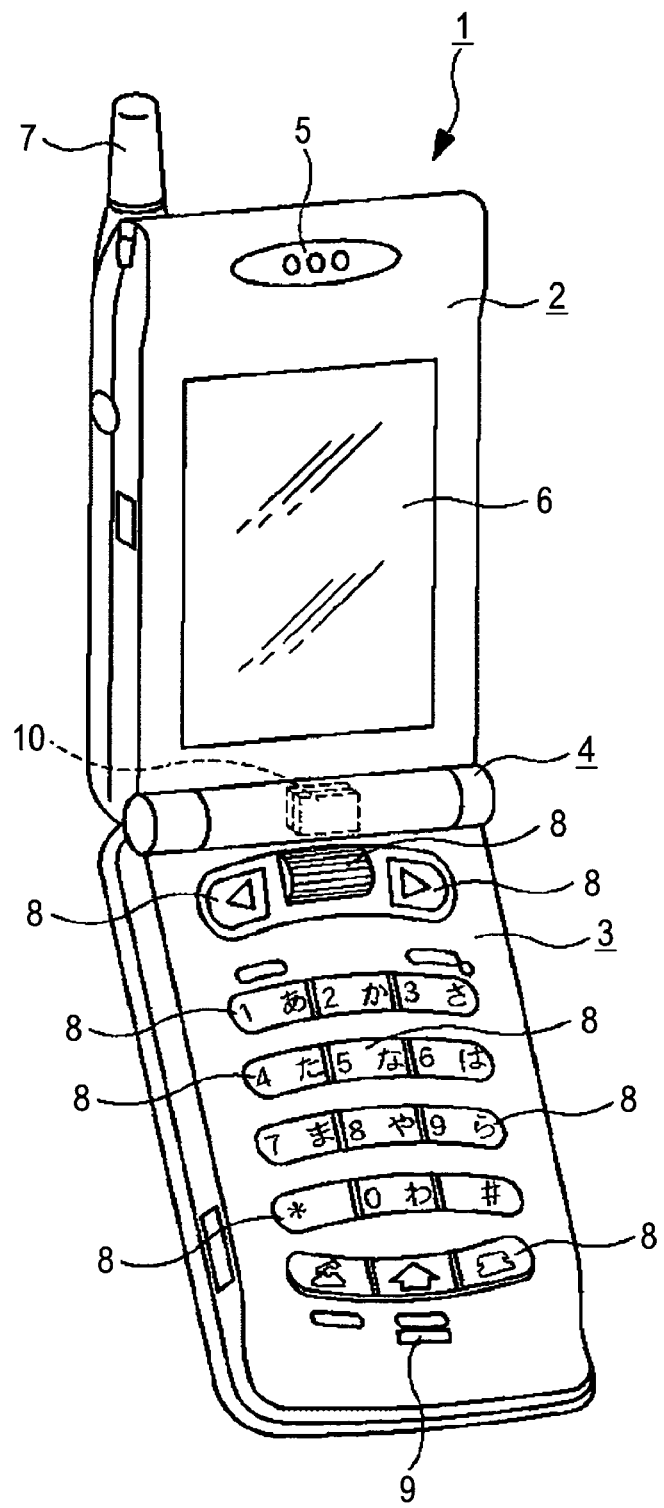
FIG. 1 is a perspective view of a mobile phone.

A mobile phone 1 in which a camera module according to an embodiment of the invention is incorporated includes a first housing 2 and a second housing 3, which are so connected to each other via a hinge 4 that the resultant structure is foldable, as shown in FIG. 1. A loudspeaker 5, a display 6, and an antenna 7 are provided in the first housing 2. The antenna 7 is extendable. A variety of operation components 8, 8, ..., such as push buttons and rotary dials, and a microphone 9 are provided in the second housing 3. A camera module 10 is incorporated in the hinge 4. Among the operation components 8, 8, ..., a predetermined push button functions as an image capturing operation component 8. Pressing the operation component 8 activates the camera module 10 and allows a user to capture an image.

The camera module 10 is not necessarily disposed in the hinge 4 but may be disposed in the first housing 2 or the second housing 3. Further, the mobile phone 1 may include a plurality of camera modules 10. That is, the mobile phone 1 is an electronic apparatus that also functions as an imaging apparatus.

(2. Description of Camera Module)

2-1. First Embodiment

Figure 2:
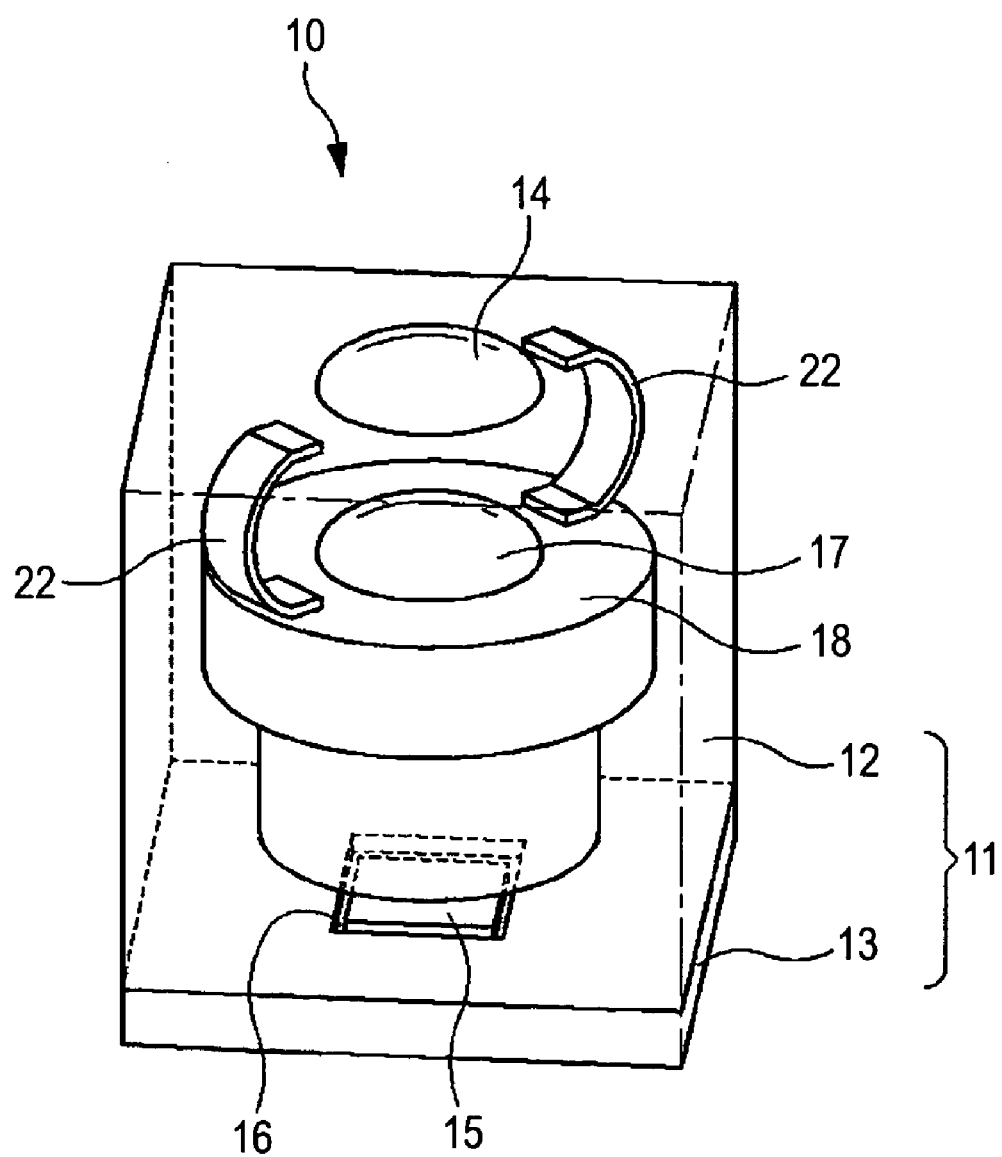
FIG. 2 is a perspective view of a camera module to which the invention is applied.
Figure 3:
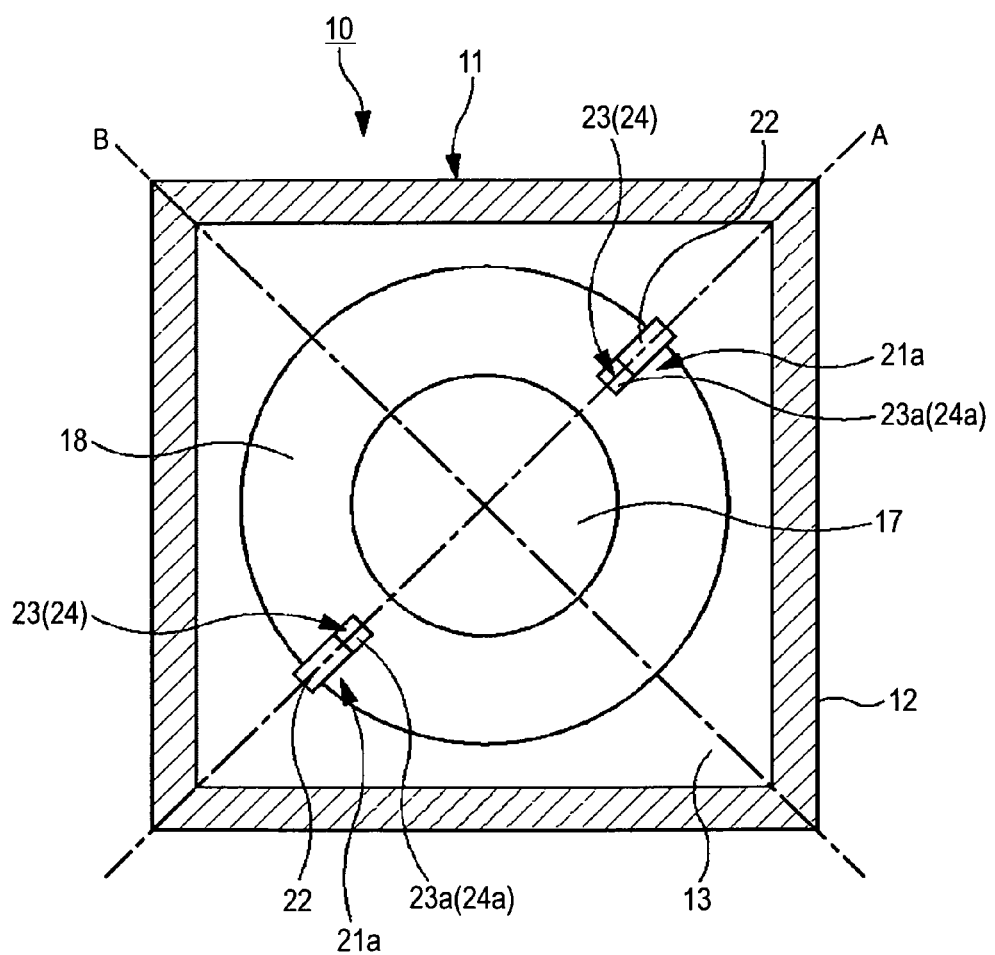
FIG. 3 is a transverse cross-sectional view of the camera module to which the invention is applied.
Figure 4:
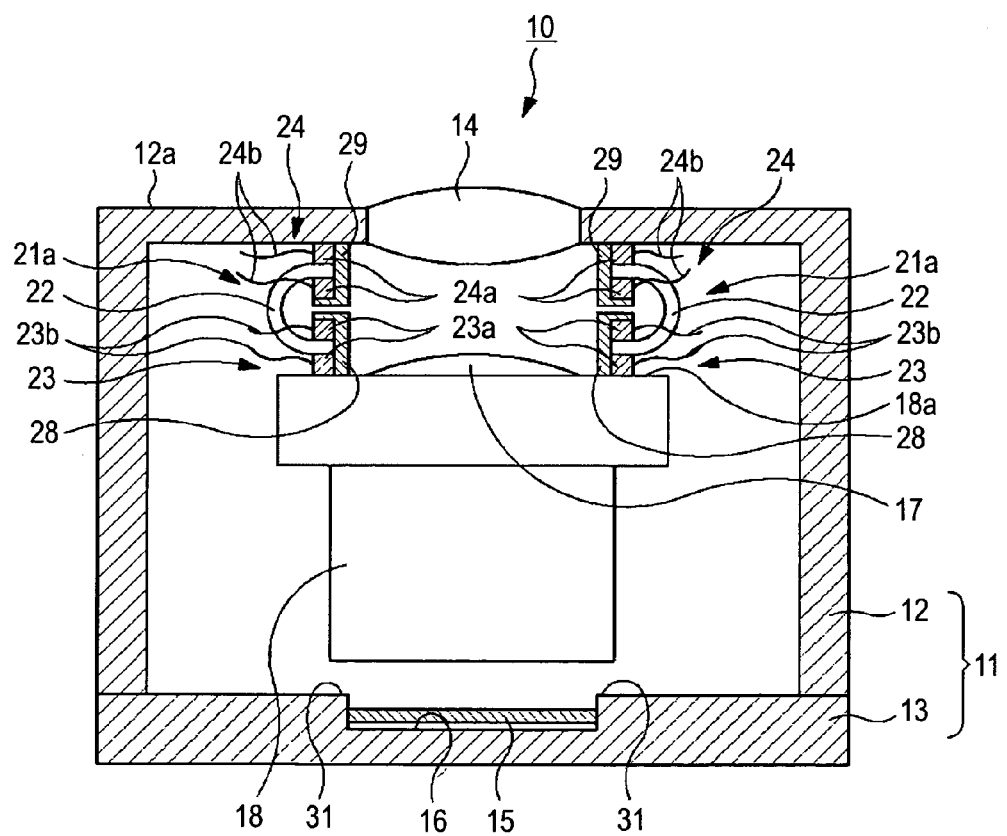
FIG. 4 is a longitudinal cross-sectional view of the camera module to which the invention is applied and shows a state in which polymer actuators bend.

The camera module 10 includes a lens barrel 11, as shown in FIGS. 2 to 4. The lens barrel 11 is formed of a front barrel 12 and a rear barrel 13. The front barrel 12 has an imaging lens 14 disposed therein, and the rear barrel 13 has an imaging device 15 disposed therein with the optical axis of the imaging device 15 coinciding with the optical axis of the lens 14, which is formed of a plurality of lenses. The imaging device 15 is a CCD (Charge Coupled Device) sensor or a CMOS (Complementary Metal Oxide Semiconductor) sensor. The imaging device 15 is, for example, fixed into an attachment recess 16 in the rear barrel 13. It is noted that the imaging lens 14 is not necessarily required in the invention.

The imaging lens 14, which is disposed in the front barrel 12 with the optical axis of the imaging lens 14 coinciding with the optical axis of the imaging device 15, is formed of a plurality of lenses including a focusing lens 17, which is a movable lens, held in a lens holder 18. The lens holder 18, which holds the focusing lens 17, is moved with an actuator, which will next be described, in the optical axis direction.

Figure 5A:
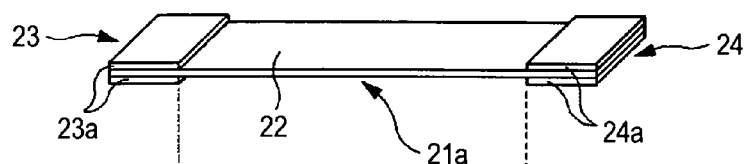
FIG. 5A is a perspective view of a polymer actuator used in the invention with terminals provided at both ends thereof.

The actuator is a polymer actuator 21a. The polymer actuator 21a is formed of a polymer film 22 and terminals 23 and 24 disposed thereon, as shown in FIG. 5A. When voltages are applied via the terminals 23 and 24 to the polymer film 22 in the thickness direction thereof, the polymer film 22 deforms. That is, when a voltage is applied to the polymer film 22, which is made of an ion exchange resin, cations in a polymer electrolyte move toward the cathode, and the resultant difference in swelling between the front and back surfaces causes the polymer film 22 to deform. The polymer film 22 can be so configured that a greater thickness thereof causes a larger generated force. Further, the direction in which the polymer film 22 deforms can be switched by switching the polarity of the applied voltage.

In the polymer actuator 21a, the first terminal 23 and the second terminal 24 are provided at the longitudinal ends of the polymer film 22, which has a substantially rectangular band-like shape, as shown in FIG. 5A. The first terminal 23 is formed of a pair of electrodes 23a, 23a that sandwich one end of the polymer film 22, and the second terminal 24 is formed of a pair of electrodes 24a, 24a that sandwich the other end of the polymer film 22.

Figure 6A:
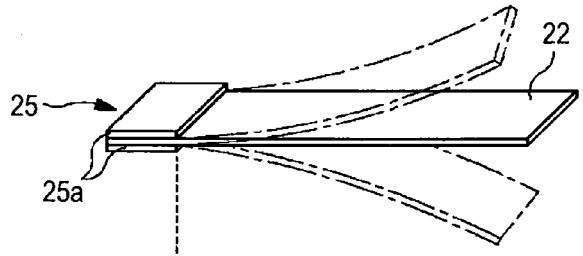
FIG. 6A is a perspective view of a polymer actuator as a reference with a terminal provided on only one side thereof.
Figure 6B:
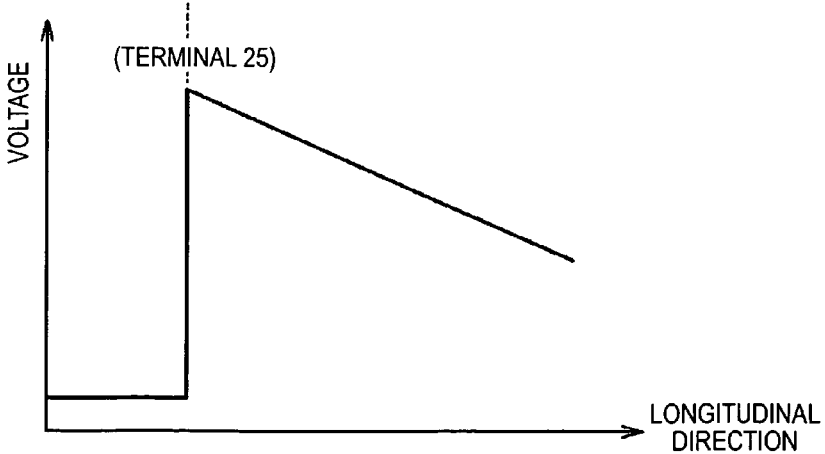
FIG. 6B shows a voltage characteristic in the longitudinal direction of the polymer actuator.

When a terminal 25 is provided at only one end of the polymer film 22 and the terminal 25 is formed of a pair of electrodes 25a, 25a that sandwich the polymer film 22, as shown in FIG. 6A, the voltage applied to the polymer film 22 has the characteristic shown in FIG. 6B. That is, since the polymer film 22 has membrane resistance across its surface, the voltage applied to the polymer film 22 and hence the response speed thereof gradually decreases with distance from the terminal 25 in the longitudinal direction. That is, when a voltage is applied to the end of the polymer film 22, the response speed is not uniform across the polymer film 22 in the longitudinal direction.

Figure 5B:
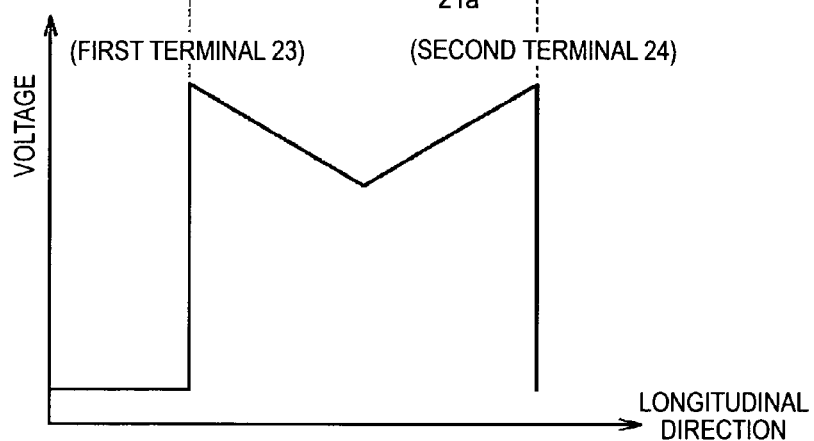
FIG. 5B shows a voltage characteristic in the longitudinal direction of the polymer actuator.

To address the problem, the first terminal 23 and the second terminal 24 are provided at respective ends of the polymer film 22 in the invention. When the first terminal 23 and the second terminal 24 are provided at respective ends of the polymer film 22, and the same voltage is applied to the first and second terminals 23, 24, the amount of decrease in voltage in the longitudinal direction of the polymer film 22 decreases, as shown in FIG. 5B, whereby the response speed of the polymer film 22 can be improved.

Figure 7:
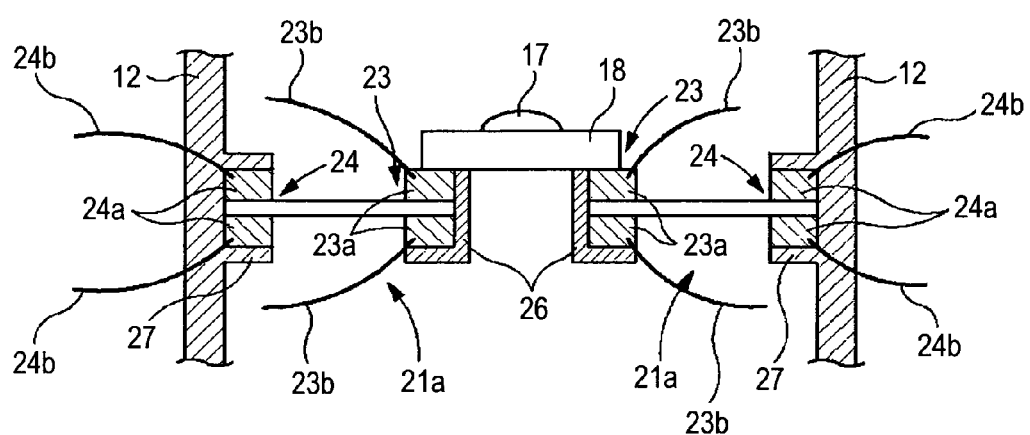
FIG. 7 is a cross-sectional view showing an example of how polymer actuators are attached.
Figure 8:
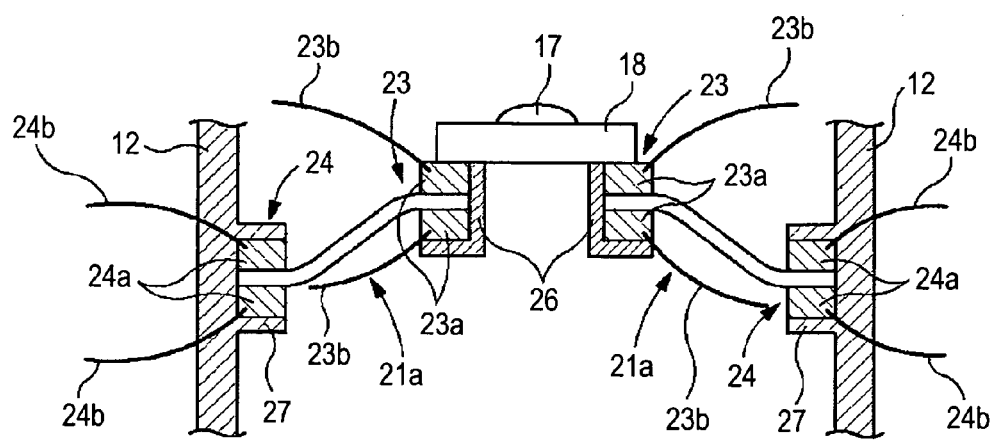
FIG. 8 is a cross-sectional view showing that the polymer actuators shown in FIG. 7 deform in one direction.

The focusing lens 17 is typically attached to the lens holder 18, as shown in FIGS. 7 and 8. In the present embodiment, two polymer actuators 21a, each of which has the first terminal 23 and the second terminal 24, are used. The polymer actuators 21a, 21a are disposed on opposite sides of the lens holder 18, to which the focusing lens 17 is attached, and support the lens holder 18. The first terminal 23 is held by a first attachment portion 26 formed on the outer surface of the lens holder 18, to which the focusing lens 17 is attached, and the second terminal 24 is held by a second attachment portion 27 formed on the inner circumferential surface of the front barrel 12. The structure of each of the first and second attachment portions 26, 27 is not limited to a specific one and may, for example, be a structure in which the first or second terminal 23 or 24 is fixed into a recess with an adhesive. The first attachment portion 26 may be formed in any position of the lens holder 18, and the second attachment portion 27 may also be formed in any position of the inner circumferential surface of the front barrel 12. The pair of electrodes 23a, 23a disposed on the first terminal 23 and the pair of electrodes 24a, 24a disposed on the second terminal 24 are connected to power feed wiring lines 23b and 24b, respectively. Electric power may be fed to the pairs of electrodes 23a, 23a and 24a, 24a by using a flexible wiring board or through wire bonding. The polymer actuators 21a are not necessarily controlled based on voltage but may be controlled based on current.

In this case, when voltages having the same polarity are applied to the electrodes 23a, 23a and 24a, 24a disposed on the first and second terminals 23, 24, the polymer films 22, 22 deform in the same manner, as shown in FIG. 8. The direction in which the polymer films 22, 22 deform coincides with the optical axis direction, which is substantially perpendicular to the direction in which the polymer films 22 extend from the inner circumferential surface of the front barrel 12. The focusing lens 17 held by the lens holder 18 thus moves forward and backward along the optical axis. The lens holder 18 tends to lower due to its own weight but can be held, for example, perpendicular to the inner circumferential surface of the front barrel 12 by applying an initial voltage to the first and second terminals 23, 24 in advance. The direction in which the polymer actuators 21a, 21a deform can be switched by switching the polarity of the voltages applied to the first and second terminals 23, 24.

In the example shown in FIGS. 7 and 8, the number of polymer actuators 21a to be used should be at least two but is not limited to a specific number. A greater number of polymer actuators 21a can support the lens holder 18 more stably. That is, as shown in FIG. 3, two polymer actuators 21a, 21a may be disposed along one of the diagonals (line A in FIG. 3) of the front barrel 12 having a substantially rectangular cross-sectional shape, or four polymer actuators 21a may be disposed along the two diagonals (lines A and B in FIG. 3). The lens holder 18 can be supported more stably by arranging three or more polymer actuators 21a at equal intervals.

As described above, the direction in which the polymer films 22, 22 deform coincides with the optical axis direction, which is perpendicular to the direction in which the polymer films 22 extend from the inner circumferential surface of the front barrel 12, as shown in FIGS. 7 and 8. Each of the polymer films 22, 22 extending in the direction perpendicular to the optical axis has, for example, the second terminal 24 on the side where the lens holder 18 is present. As a result, the weight of the first terminal 23 acts on each of the polymer films 22, 22 in addition to the weight of the lens holder 18, to which the focusing lens 17 is attached, and the resultant weight may prevent the lens holder 18 from deforming in the optical axis direction. Further, when the power feed wiring lines 24b connected to the second terminals 24 are not sufficiently long, the amount of deformation is limited. On the other hand, a sufficient length makes it difficult to route the wiring lines 24b to the pair of electrodes 24a, 24a.

Figure 9:
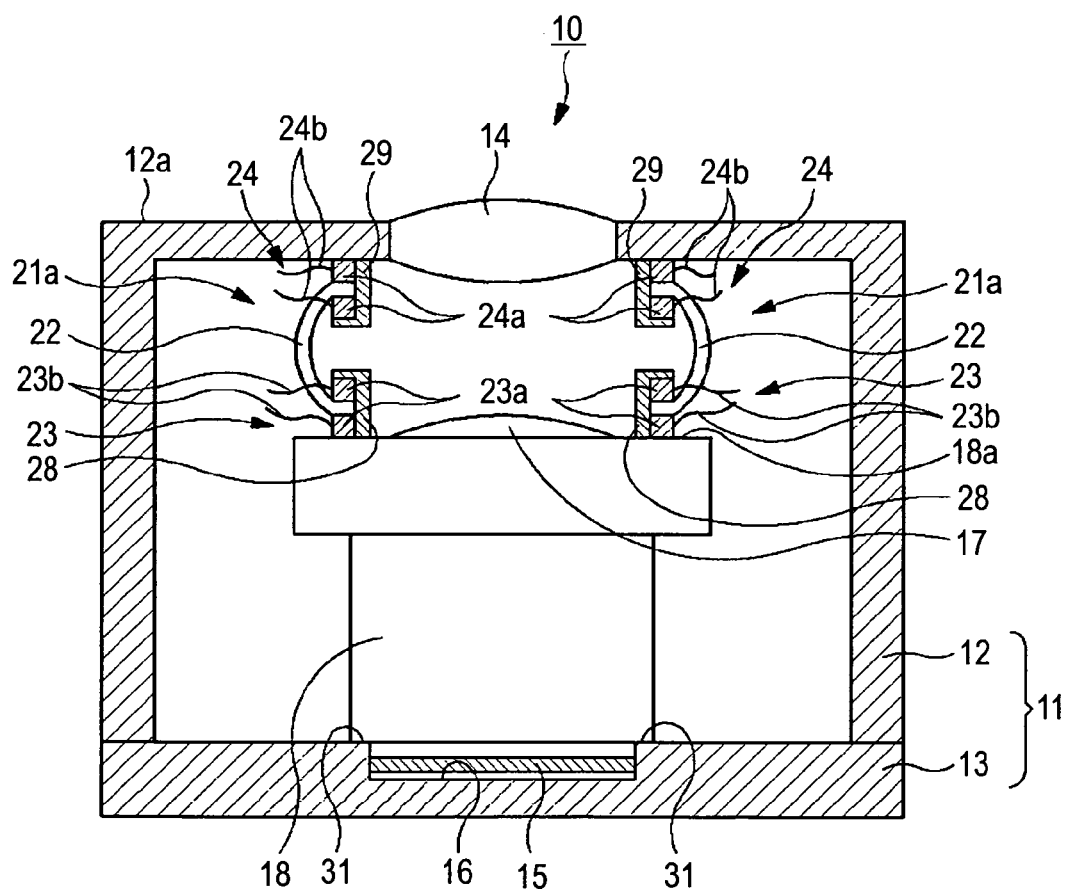
FIG. 9 is a cross-sectional view showing a state in which the polymer actuators shown in FIG. 4 extend.

To address the problem, the polymer actuators 21a in the camera module 10 are not provided as shown in FIGS. 7 and 8 but are provided as shown in FIGS. 4 and 9.

That is, the polymer actuators 21a, 21a are bent and disposed between the lens holder 18, which holds the focusing lens 17, and an upper portion 12a of the front barrel 12. Two polymer actuators 21a, each of which has the first terminal 23 and the second terminal 24, are also used in FIGS. 4 and 9. The polymer actuators 21a, 21a, which are attached to the upper portion 12a of the front barrel 12, support the lens holder 18, to which the focusing lens 17 is attached. In this example as well, the number of polymer actuators 21a should be at least two but is not limited to a specific number. The lens holder 18 can be supported stably by arranging the polymer actuators 21a at equal intervals.

Each of the first terminals 23 is held by a first attachment portion 28 formed on an upper portion 18a of the lens holder 18, to which the focusing lens 17 is attached. Each of the second terminals 24 is held by a second attachment portion 29 formed on the inner surface of the upper portion 12a of the front barrel 12. The structure of each of the first and second attachment portions 28, 29 is not limited to a specific one and may, for example, be a structure in which the first terminal 23 or the second terminal 24 is fixed into a recess with an adhesive. The first attachment portion 28 may be formed in any position of the lens holder 18, and the second attachment portion 29 is not necessarily formed in a specific position and may be formed in any position in the front barrel 12. The pair of electrodes 23a, 23a disposed on the first terminal 23 and the pair of electrodes 24a, 24a disposed on the second terminal 24 are connected to the power feed wiring lines 23b and 24b, respectively.

Electric power may be fed to the pairs of electrodes 23a, 23a and 24a, 24a by using a flexible wiring board or through wire bonding. The polymer actuators 21a are not necessarily controlled based on voltage but may be controlled based on current.

In the camera module 10 shown in FIGS. 4 and 9, the lens holder 18 lowers due to its own weight when no voltage is applied to the first and second terminals 23, 24, as shown in FIG. 9. The polymer actuators 21a, 21a, when a predetermined voltage is applied thereto, deform in the direction in which the bent polymer films 22, 22 extend. When the polymer actuators 21a, 21a extend by the largest amount, the lower end of the lens holder 18 abuts an abutment portion 31 around the imaging device 15 in the rear barrel 13. The position where the lower end of the lens holder 18 abuts the abutment portion 31 is the origin of the lens holder 18.

Figure 10A:
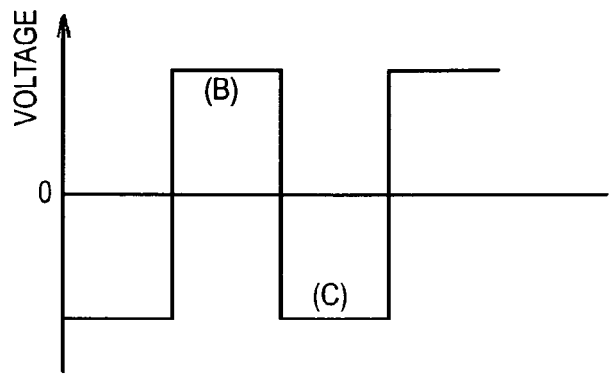
FIG. 10A shows the polarity of a voltage applied to first and second terminals of the polymer actuators shown in FIGS. 4 and 9.
Figure 10B:
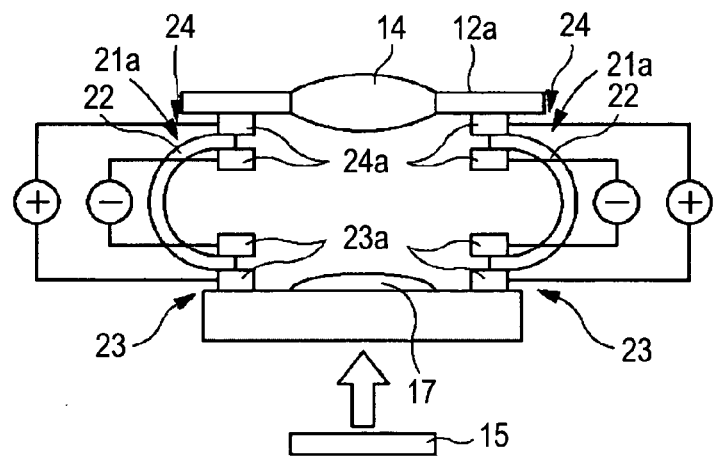
FIG. 10B shows a state in which the polymer actuators bend.

When the same voltage having a first polarity is applied to the first and second terminals 23, 24 of the polymer actuators 21a, 21a, the bent polymer films 22, 22 deform in the direction in which they can bend, as shown in FIGS. 4, 10A, and 10B. The focusing lens 17 held by the lens holder 18 thus moves in the direction away from the imaging device 15.

Figure 10C:
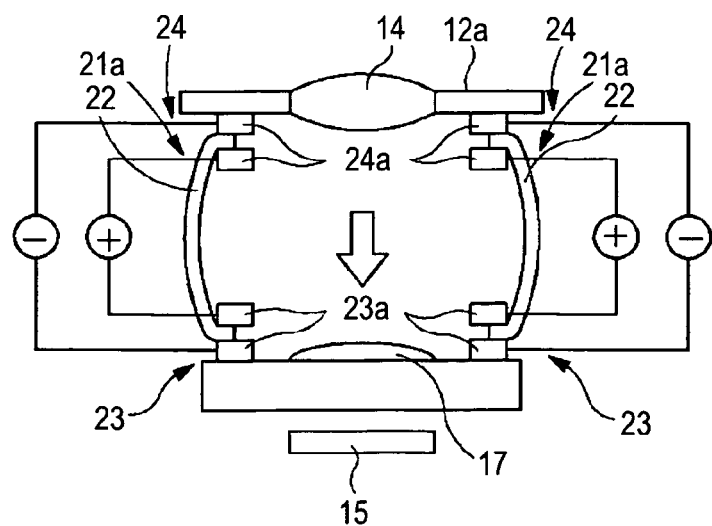
FIG. 10C shows a state in which the polymer actuators extend.

On the other hand, when the same voltage having a second polarity that is opposite to the first polarity is applied to the first and second terminals 23, 24 of the polymer actuators 21a, 21a, the bent polymer films 22, 22 deform in the direction in which they can extend, as shown in FIGS. 9, 10A, and 10C. The focusing lens 17 held by the lens holder 18 can thus move in the direction toward the imaging device 15.

In this example, the polarities of the voltages applied to the polymer actuators 21a, 21a are the same in principle, and the travel of the focusing lens 17 can be controlled by changing the magnitude of the applied voltages.

The thus configured camera module 10 uses the two polymer actuators 21a, 21a, and a voltage is applied to both sides of each of the polymer actuators 21a. As a result, in the camera module 10, decrease in voltage due to membrane resistance across the surfaces of the polymer films 22 can be reduced, whereby the response speed of the polymer actuators 21a can be improved. Further, in the example shown in FIGS. 4, 9, and 10A to 10C, the polymer actuators 21a, 21a are so configured that the bent polymer films 22 connect the lens holder 18 to the front barrel 12. In the thus configured camera module 10, not only can the amount of load acting on the polymer actuators when they are deformed be reduced and the response speed thereof can be improved accordingly but also the wiring can be simplified.

In the thus configured camera module 10, the lens holder 18 may be elastically supported upward with a spring or any other suitable elastic member provided under the lens holder 18. The elastic member may, for example, be an elastic support member formed of a plate spring, which will be described below, or a coil spring or any other suitable component disposed between the rear barrel 13 and the lens holder 18.

2-2 Second Embodiment

Figure 11:
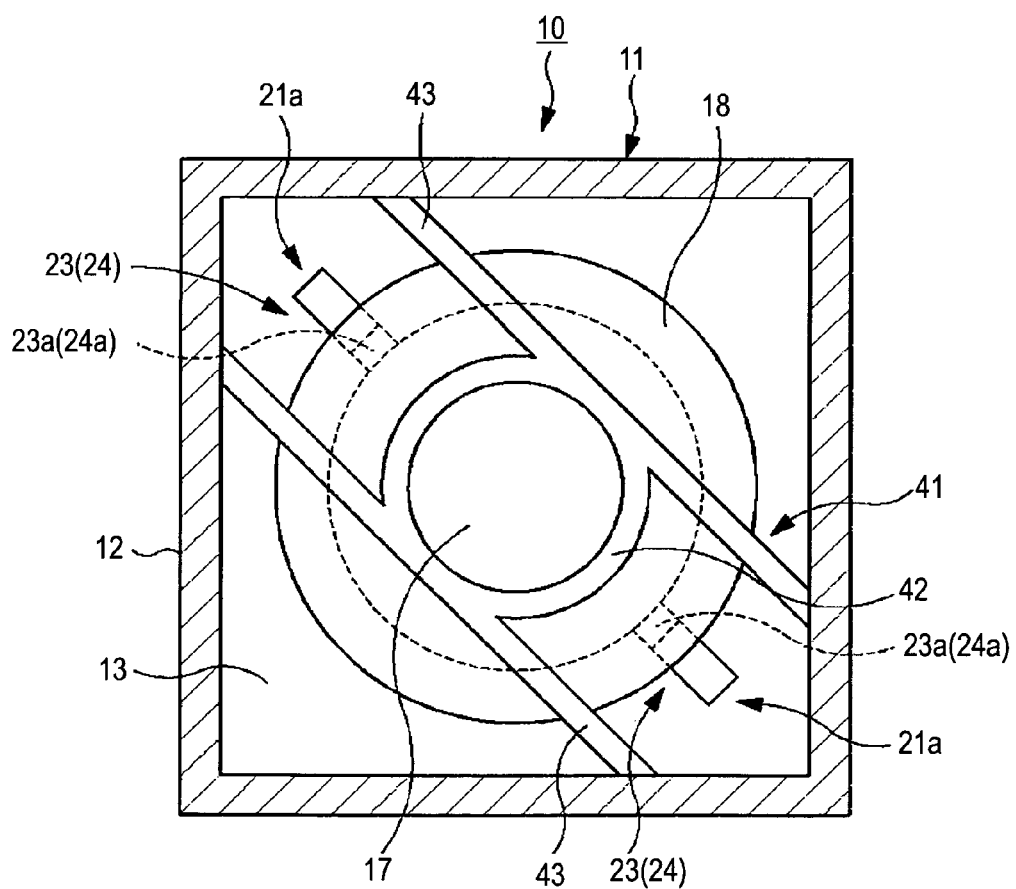
FIG. 11 is a transverse cross-sectional view of a variation of the camera module to which the invention is applied.
Figure 12:
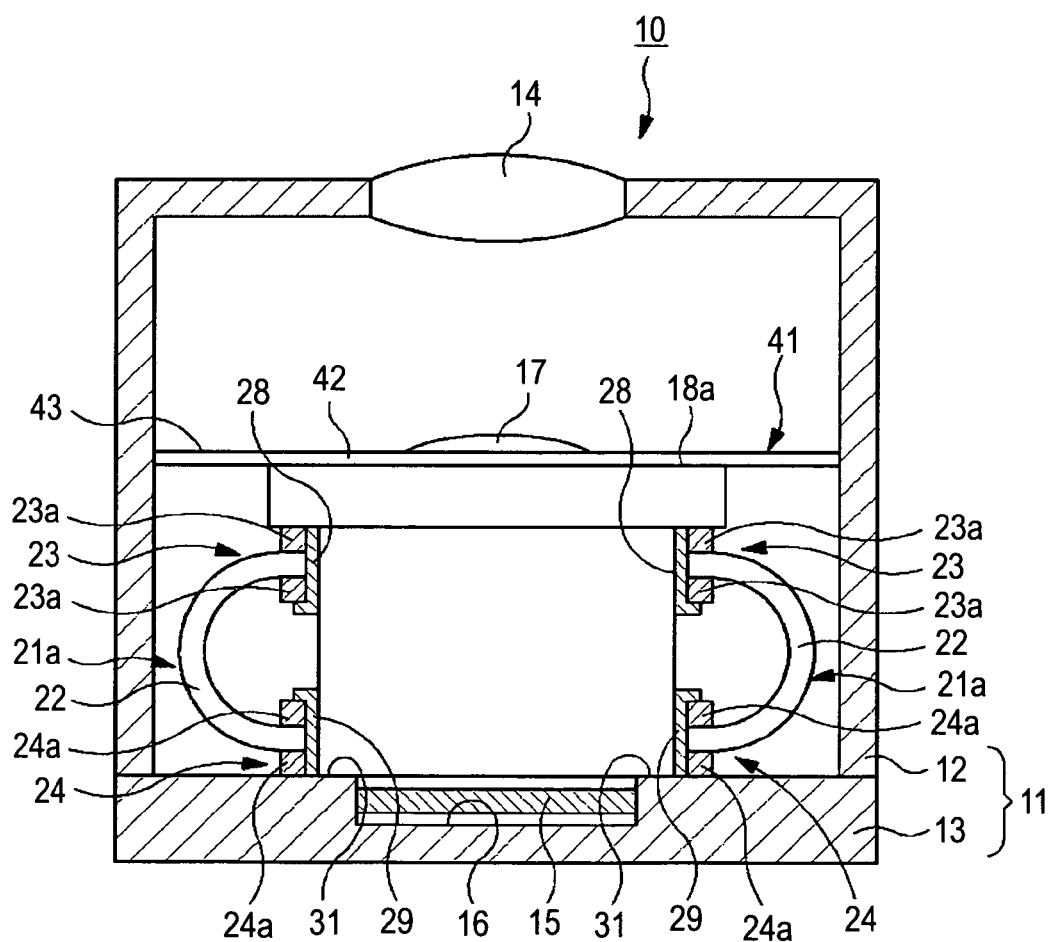
FIG. 12 is a longitudinal cross-sectional view of the variation of the camera module to which the invention is applied and shows a state in which polymer actuators bend.

A camera module 10 described in the present embodiment is so configured that the polymer actuators 21a, 21a are bent and disposed between the lens holder 18, which holds the focusing lens 17, and the rear barrel 13, as shown in FIGS. 11 and 12. In this example as well, the number of polymer actuators 21a should be at least two but is not limited to a specific number. The lens holder 18 can be supported stably by arranging the polymer actuators 21a at equal intervals.

The camera module 10 includes an elastic support member 41 that causes the lens holder 18 to abut a portion around of the imaging device 15 in the rear barrel 13. The elastic support member 41 is, for example, a plate spring including an annular portion 42 that supports a portion around the focusing lens 17 held by the lens holder 18 and connecting portions 43, 43, 43, 43 that connect the annular portion 42 to the inner wall of the front barrel 12. The annular portion 42 is fixed to a portion of the upper portion 18a of the lens holder 18 that is around the focusing lens 17, for example, with an adhesive. The end of each of the connecting portions 43, 43, 43, 43, which are extended integrally with the annular portion 42, is fixed to the inner wall of the front barrel 12 with an adhesive or by engaging the end into an engaging groove in the inner wall. The elastic support member 41 so urges the lens holder 18 that it abuts the abutment portion 31 around the imaging device 15 in the rear barrel 13. In the camera module 10, the position where the lower end of the lens holder 18 abuts the abutment portion 31 around the imaging device 15 in the rear barrel 13 is therefore the origin of the lens holder 18.

The first terminal 23 of each of the polymer actuators 21a is inserted into a first attachment portion 28 formed on the lens holder 18, to which the focusing lens 17 is attached, and held in the first attachment portion 28. Similarly, the second terminal 24 is inserted into a second attachment portion 29 formed in a portion around the imaging device 15 in the rear barrel 13 and held in the second attachment portion 29. The structure of each of the first and second attachment portions 28, 29 is not limited to a specific one and may, for example, be a structure in which the first terminal 23 or the second terminal 24 is fixed into a recess with an adhesive. The first attachment portion 28 may be formed in any position of the lens holder 18, and the second attachment portion 29 is not necessarily be formed in a specific position and may be formed in any position in the rear barrel 13. The pair of electrodes 23a, 23a disposed on the first terminal 23 and the pair of electrodes 24a, 24a disposed on the second terminal 24 are connected to the power feed wiring lines 23b and 24b, respectively. Electric power may be fed to the pairs of electrodes 23a, 23a and 24a, 24a by using a flexible wiring board or through wire bonding. The polymer actuators 21a is not necessarily controlled based on voltage but may be controlled based on current.

In the thus configured camera module 10, when the same voltage having a first polarity is applied to the first and second terminals 23, 24 of the polymer actuators 21a, 21a, the bent polymer films 22, 22 deform in the direction in which they can bend, as shown in FIG. 12. The focusing lens 17 held by the lens holder 18 thus moves in the direction toward the imaging device 15 and deforms, for example, until the focusing lens 17 abuts the abutment portion 31. Since the elastic support member 41 so urges the lens holder 18 that it abuts the abutment portion 31, the lens holder 18 can be positioned at the origin thereof.

Figure 13:
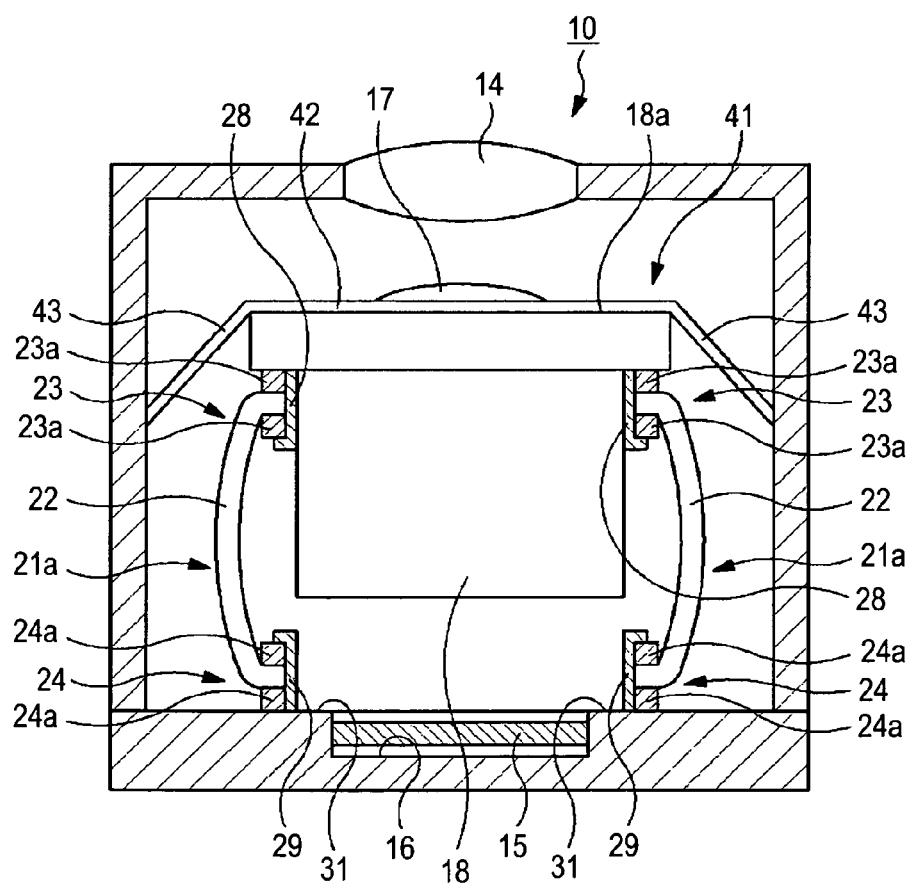
FIG. 13 is a longitudinal cross-sectional view of the variation of the camera module to which the invention is applied and shows a state in which the polymer actuators extend.

On the other hand, when the same voltage having a second polarity that is opposite to the first polarity is applied to the first and second terminals 23, 24 of the polymer actuators 21a, 21a, the bent polymer films 22, 22 deform in the direction in which they can extend, as shown in FIG. 13. The lens holder 18 can thus move against the urging force of the elastic support member 41, and the focusing lens 17 held by the lens holder 18 can move in the direction away from the imaging device 15.

The thus configured camera module 10 shown in FIGS. 12 and 13 also uses the two polymer actuators 21a, 21a, and a voltage is applied to both sides of each of the polymer actuators 21a. As a result, in the camera module 10, decrease in voltage due to membrane resistance across the surfaces of the polymer films 22 can be reduced, whereby the response speed of the polymer actuators 21a can be improved. Further, since the polymer actuators 21a, 21a are so configured that the bent polymer films 22, 22 connect the lens holder 18 to the front barrel 12, not only can the amount of load acting on the polymer actuators when they are deformed be reduced and the response speed thereof can be improved accordingly but also the wiring can be simplified.

In the camera module 10 shown in FIGS. 12 and 13, the elastic support member 41, which causes the lens holder 18 to abut a portion around the imaging device 15 in the rear barrel 13, may be omitted.

2-3 Variation of Polymer Actuator

Figure 14:
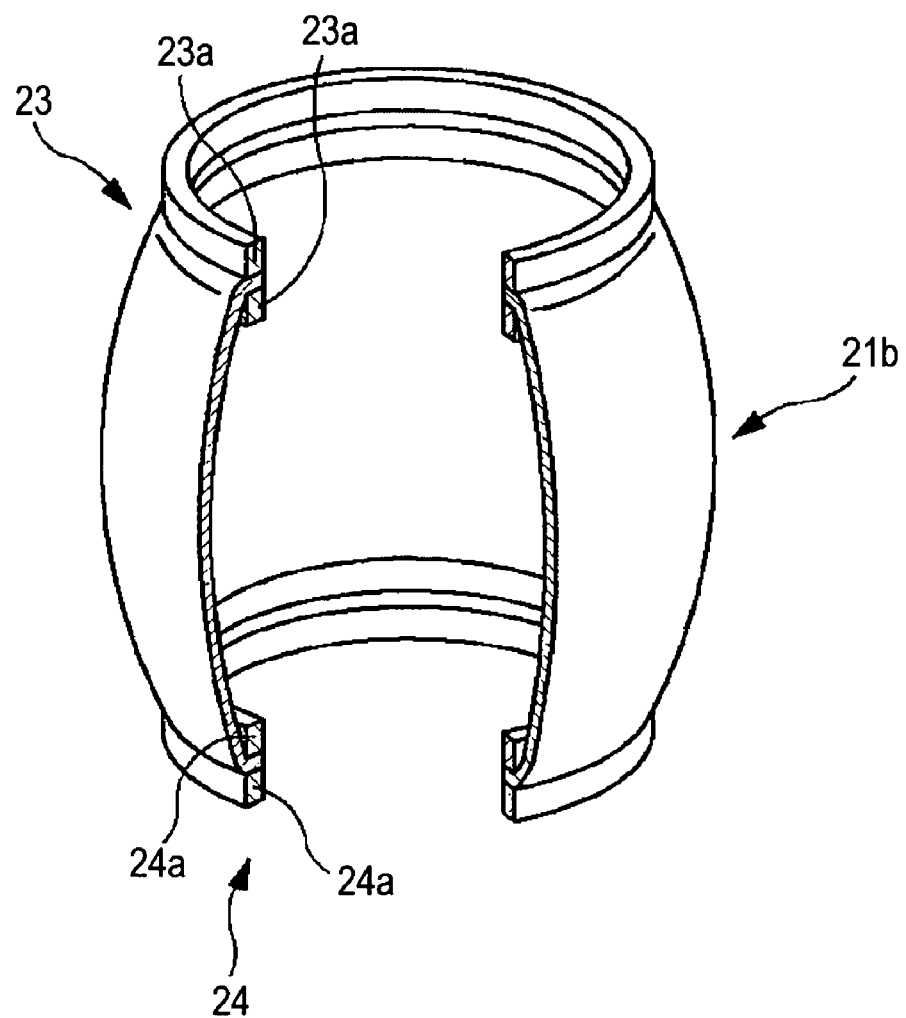
FIG. 14 is a perspective view showing a variation of the polymer actuator.

Each of the polymer actuators 21a described above has a band-like shape but may alternatively have a barrel-like shape in which a middle portion thereof in the height direction is larger in diameter than the other portions and an opening having side surfaces facing each other is formed, as shown in FIG. 14. The barrel-shaped polymer actuator 21b is so configured that the first terminal 23 is provided at one end of each of the side surfaces and the second terminal 24 is provided at the other end of each of the side surfaces. The first terminal 23 has a pair of electrodes 23a, and the second terminal 24 has a pair of electrodes 24a. Having a curved circumferential side surface, the polymer actuator 21b works in the same manner as in a case where band-shaped polymer actuators 21a are provided in an annular shape around the focusing lens 17. Using the barrel-shaped polymer actuator 21b allows the lens holder 18 to be supported more stably than in a case where several band-shaped polymer actuators 21a are used. The barrel-shaped polymer actuator 21b can be used in the camera module 10 having been described in the first and second embodiments.

(3. Variations)

The above embodiments have been described with reference to the case where the camera module 10 is incorporated in the mobile phone 1. The camera module 10 according to any of the embodiments of the invention can also be incorporated in a variety of small, portable electronic apparatus.

The above embodiments have also been described with reference to the case where the focusing lens 17 is disposed in the lens holder 18. The lens holder 18 may alternatively hold a zoom lens. Further, the lens barrel may be so configured that a plurality of polymer actuators 21a support the lens holder 18 that holds the focusing lens 17 and another plurality of polymer actuators 21a support a lens holder that holds a zoom lens.

The above embodiments have also been described with reference to the case where the polymer actuators 21a support the lens holder. The invention is also applicable to a case where a piezoelectric device is used as the actuator to support the lens holder in the lens barrel.

Further, to attach an actuator to a movable lens, the actuator, such as the polymer actuator 21a, may not necessarily be attached via a lens holder but may be directly attached to a flange or any other suitable portion that juts out from the circumference of the lens.

The present application contains subject matter related to that disclosed in Japanese Priority Patent Application JP 2010-069892 filed in the Japan Patent Office on Mar. 25, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera module comprising:
a barrel;
a movable lens provided to be movable in the barrel in an optical axis direction;
an imaging device that captures an image of a subject viewed through the movable lens; and
an actuator that changes the distance between the movable lens and the imaging device,
wherein the actuator has a first power feed terminal provided at one end thereof and a second power feed terminal provided at the other end thereof, the first terminal attached on the side where the movable lens is present, the second terminal attached on the side where the barrel is present, the first terminal having a pair of first terminal electrodes sandwiching the one end of the actuator therebetween, the second terminal having a pair of second terminal electrodes sandwiching the other end of the actuator therebetween, one of the pair of the first terminal electrodes and one of the pair of the second terminal electrodes being electrically connected to a first polarity, a remaining one of the pair of the first terminal electrodes and a remaining one of the pair of the second terminal electrodes being electrically connected to a second polarity being opposite of the first polarity,
the actuator bends when electric power is fed to each of the first and second terminals and changes the distance between the movable lens and the imaging device.

2. The camera module according to claim 1,
wherein the actuator is a film-shaped polymer actuator that bends when electric power is fed thereto,
each of the first terminal provided at the one end and the second terminal provided at the other end is formed of a pair of electrodes facing each other in the thickness direction of the actuator, and
a predetermined voltage is applied between the pair of electrodes.

3. The camera module according to claim 2,
wherein the actuator is bent and attached in such a way that the first terminal is attached on the side where the movable lens is present and the second terminal is attached on the side where the barrel is present.

4. The camera module according to claim 3,
wherein the actuator is disposed in the barrel on the side where light to be imaged is incident on the movable lens, and
the first terminal is attached on the side where the movable lens is present and the second terminal is attached on the side where the barrel is present.

5. The camera module according to claim 3,
wherein the actuator is disposed in the barrel between the movable lens and the imaging device, and
the first terminal is attached on the side where the movable lens is present and the second terminal is attached on the side where the barrel is present.

6. The camera module according to claim 1, when the one of the pair of the first terminal electrodes and the one of the pair of the second terminal electrodes are electrically connected to a first polarity and the remaining one of the pair of the first terminal electrodes and the remaining one of the pair of the second terminal electrodes are electrically connected to the second polarity and the first and second terminals are energized, the movable lens moves either away from the imaging device or towards the imaging device.

7. An imaging apparatus comprising:
a barrel;
a movable lens provided to be movable in the barrel in an optical axis direction;
an imaging device that captures an image of a subject viewed through the movable lens; and
an actuator that changes the distance between the movable lens and the imaging device,
wherein the actuator has a first power feed terminal provided at one end thereof and a second power feed terminal provided at the other end thereof, the first terminal attached on the side where the movable lens is present, the second terminal attached on the side where the barrel is present, the first terminal having a pair of first terminal electrodes sandwiching the one end of the actuator therebetween, the second terminal having a pair of second terminal electrodes sandwiching the other end of the actuator therebetween, one of the pair of the first terminal electrodes and one of the pair of the second terminal electrodes being electrically connected to a first polarity, a remaining one of the pair of the first terminal electrodes and a remaining one of the pair of the second terminal electrodes being electrically connected to a second polarity being opposite of the first polarity,
the actuator bends when electric power is fed to each of the first and second terminals and changes the distance between the movable lens and the imaging device.

8. The imaging apparatus according to claim 7, when the one of the pair of the first terminal electrodes and the one of the pair of the second terminal electrodes are electrically connected to a first polarity and the remaining one of the pair of the first terminal electrodes and the remaining one of the pair of the second terminal electrodes are electrically connected to the second polarity and the first and second terminals are energized, the movable lens moves either away from the imaging device or towards the imaging device.

* * * * *